(12) United States Patent
Nüesch

(10) Patent No.: US 7,305,814 B2
(45) Date of Patent: Dec. 11, 2007

(54) SAFETY ARRESTER CABLE

(75) Inventor: Walter Nüesch, Aruegg (CH)

(73) Assignee: Cortex Humbelin AG, Rupperswil (CH)

( * ) Notice: Subject to any disclaimer, the term of this patent is extended or adjusted under 35 U.S.C. 154(b) by 315 days.

(21) Appl. No.: 11/110,142

(22) Filed: Apr. 20, 2005

(65) Prior Publication Data

US 2006/0103110 A1    May 18, 2006

(30) Foreign Application Priority Data

May 10, 2004   (CH) ...................... 0817/04

(51) Int. Cl.
   *D02G 3/02* (2006.01)
(52) U.S. Cl. ........................................ 57/236
(58) Field of Classification Search ............. 57/236, 57/237

See application file for complete search history.

(56) References Cited

U.S. PATENT DOCUMENTS

| | | | |
|---|---|---|---|
| 2,321,021 A * | 6/1943 | Dyer, Jr. ................ | 174/128.1 |
| 3,222,858 A | 12/1965 | Gilmore et al. | |
| 4,199,190 A * | 4/1980 | Lindblad ................. | 280/801.1 |
| 4,776,160 A * | 10/1988 | Rees ........................... | 57/210 |
| 4,813,219 A * | 3/1989 | Rees ............................... | 57/3 |
| 6,294,088 B1 * | 9/2001 | Allington et al. ......... | 210/198.2 |
| 2003/0209003 A1* | 11/2003 | Verstraeten et al. ........... | 57/212 |

FOREIGN PATENT DOCUMENTS

| | | |
|---|---|---|
| DE | 376774 | 6/1923 |
| DE | 9005711 U1 | 12/1990 |
| FR | 1228562 | 8/1960 |
| GB | 2354264 A | 3/2001 |
| WO | 0240298 A1 | 5/2002 |

\* cited by examiner

*Primary Examiner*—Shaun R. Hurley
(74) *Attorney, Agent, or Firm*—Ziolkowski Patent Solutions Group, SC

(57) ABSTRACT

Safety arrester cables are provided to connect a wheel of a racing car to its chassis. The safety arrester cable is formed of a multitude of untwisted windings that form closed loops. An open tab is formed at both ends of each of the windings. The windings in the safety arrester cable are manufactured to be comprised of more than 70% nickel or an austenitic Ni—Cr alloy. A safety arrester cable comprised of such wires, and having a diameter of about 12 mm, achieves a maximal tear force of about 58 kN and a work absorption until reaching a maximal tear force of 8,900 N.m.

10 Claims, 4 Drawing Sheets

SAFETY ARRESTER CABLE

FIELD OF THE INVENTION

The present invention relates to a safety arrester cable for connecting a wheel of a racing car to its chassis, wherein the cable is formed of a multitude of untwisted windings which form closed loops, and wherein at least one open tab is formed at both ends.

BACKGROUND OF THE INVENTION

Safety arrester cables, in the state of the art, are applied where connections which are rigid per se, are to be able to be destroyed under certain conditions, and it is to be ensured that the part which has broken away may not fly off in an uncontrolled manner and on account of this create larger damage or endanger people.

In motor racing sport it is often the case that with collisions of two vehicles, or of a vehicle with the bordering of the racing track, the wheel axles and their suspension break, and the wheel flies off in an uncontrolled manner or is catapulted away. People at the edge of the racing track have often been injured or even killed by way of this. This problem is known and safety regulations have been imposed to the extent that the wheels must be connected to the body of the vehicle via a safety arrester cable. Until now many grave accidents have been avoided by way of this safety precaution, but despite this, the safety arrester cables applied until now still have an insufficient effect.

On the market today there are fibers or yams manufactured from these which have a tear strength which is a multiple greater than that of steel fibers. Whilst for example steel fibers have tear strength of 3.0 cN/dtex, carbon fibers have tear strength of 20 cN/dtex. The relatively elastic m-aramide fibers also have a tear strength of 4.7 CN/dtex, whilst the rigid p-aramide fibers have a tear strength of 19 CN/dtex and modem PBO fibers even have tear strength of about 37 cN/dtex. Safety arrester cables which are manufactured from these modem highly tear-resistant fibers, such as carbon fibers, p-aramide fibers and PBO fibers are capable of accommodating tensile forces which indeed far exceed the forces which actually occur.

Accordingly such safety arrester cables have been manufactured of corresponding highly tear-resistant plastic fibers, wherein the corresponding yams of such highly tear-resistant fibers have been endlessly wound between the two end attachment eyelets. The corresponding fibers as a result of this all run parallel to one another. With regard to those accidents which were investigated, one could ascertain that the cable stood up to the forces occurring between the two attachment eyelets, whilst it was the attachment eyelets which were broken. This is not very surprising since the highly tear-resistant materials usually have an extension up to the breakage of 1.5 to maximally 3.5 percent. This in principle could also be compensated by way of manufacturing a correspondingly long safety arrester cable. This however cannot be done since on account of this there would exist the danger that the wheel which is attached to the arrester cable could impact the driver. Added to this is the fact that it is indeed in motor racing sport that an as light as possible safety arrester cable with an as low as possible air resistance is desired. Thus it is no solution to manufacture the safety arrester cables of a less high-strength but more elastic material and to design the cable accordingly thicker.

The problem may only be solved if the cable has the best possible work-to-break-energy. This has already been attempted to be achieved according to GB 2,373,561 A by way of providing the safety arrester cable with an impulse-absorbing means. Here an inner cylinder which is to be deformed and onto which the safety arrester cable is directly tabbed, is arranged in an outer cylinder. Such a solution however not only leads to weight problems but also material problems and practically merely shifts these from the cable to the shock-absorbing element.

At present, in formula 1 motor racing sport it is essentially the safety arrester cables according to WO 03/048602 of the applicant which are used. These have also proven their worth and fulfill all the regulations of the FIA.

However these regulations are to be amended since with regard to the plastic, reservations are made with regard to the plastic that their ageing and UV loading could lead to uncontrolled deficiencies in quality. For this reason purely plastic cables will no longer be permitted.

SUMMARY OF THE INVENTION

It is therefore the object of the present invention to provide a safety arrester cable which comprises a higher metal share and at the same time achieves the strength values with an as low as possible cable cross section.

This object is achieved by a safety arrester cable of the initially mentioned type with the features described here below.

In its simplest design, the safety arrester cable according to the invention is manufactured such that a single metal wire of Ni or of an austenitic Ni—Cr alloy is manufactured. Here this wire is formed in an endless manner by way of a multitude of parallel-running loops. With this practically a longitudinally extended winding or a multitude of loops arises, wherein this may be called a winding or windings depending on the manufacturing methods. The number of windings is of course directed to the strength of the safety arrester cable to be achieved. With regard to this it is not so much the maximal tear strength of the cable which is of interest, but rather the work capable of being absorbed until reaching the maximum force capable of being accommodated, or rather the total work until the tearing of the cable. This will be dealt with at a later stage. A protective sleeve is attached over the parallel windings in the region of the parallel regions running in an extended manner, wherein this covering does not serve for the protection of the wire from external influences, but is rather to ensure the relative position of the individual windings to one another. In each case an open tab remains free at the turning locations. These open tabs serve for the attachment on the one hand on the wheel and on the other hand on the chassis. Accordingly bolts are provided on these two parts on which the cable may be secured such that it may be suspended.

With the trials which have been carried out, it has been shown that the maximal work to be absorbed until reaching the maximal tear force hardly increases with larger cable diameters, which at a first glance would appear to be incomprehensible. This evidently is due to the fact that with thicker cables, the loading of the wire is different at the turning locations, where the tabs are formed. At the same time it has been shown that one may reduce this problem by way of dividing the tabs into two tab parts.

BRIEF DESCRIPTION OF THE DRAWINGS

There are shown in.

DETAILED DESCRIPTION OF THE INVENTION

For an improved understanding, three various embodiments of the arrester cable according to the invention are shown in a purely schematic manner. The cable is always indicated in its entirety at 1. It consists of a multitude of windings 2. These windings 2 at the ends form the mentioned open tabs 3. A protecting covering 4 in the region between the two tabs 3 is pushed over the windings 2 which amongst one another run in a parallel manner. This supporting covering 4 may for example be designed as a shrinkage sleeve. Since as already mentioned, the maximal work to be absorbed up to reaching the maximal tear force is dependent on a force which is introduced onto the wire at the turning locations in an as uniform as possible manner, it has been shown to be advantageous to subdivide the tabs 3 in each case into two part tabs 5. By way of this the cable as a whole at the turning locations is less thick at the tabs so that the difference between the outermost-lying windings 2 and the innermost-lying windings is less large. Thus rather a constant force occurs over the whole wire.

Figure 1:
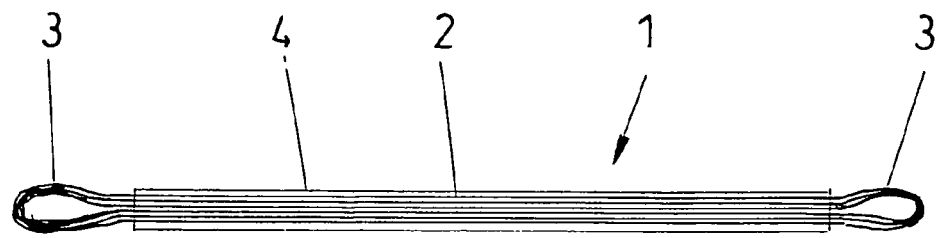
FIG. 1 a safety arrester cable with simple end tabs.
Figure 2:
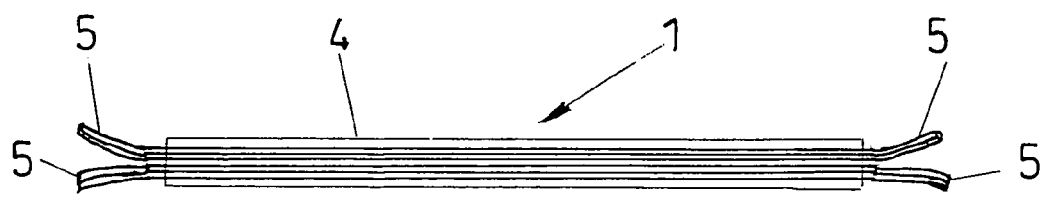
FIG. 2 one embodiment of the safety arrester cable with two end tabs.
Figure 3:
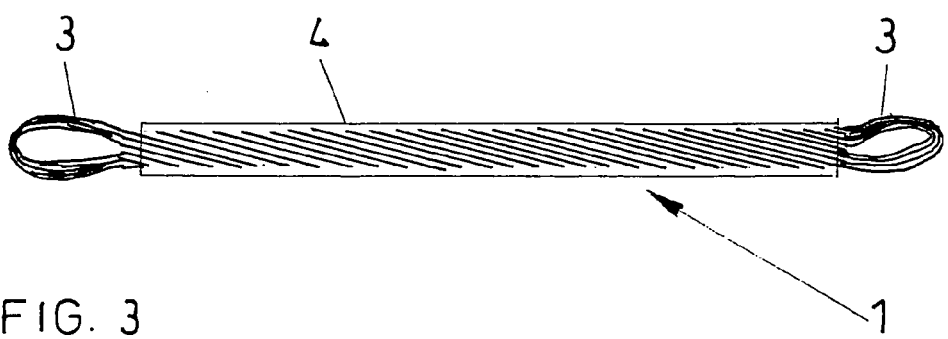
FIG. 3 a safety arrester cable with which the extended wound cable is twisted.
Figure 4:
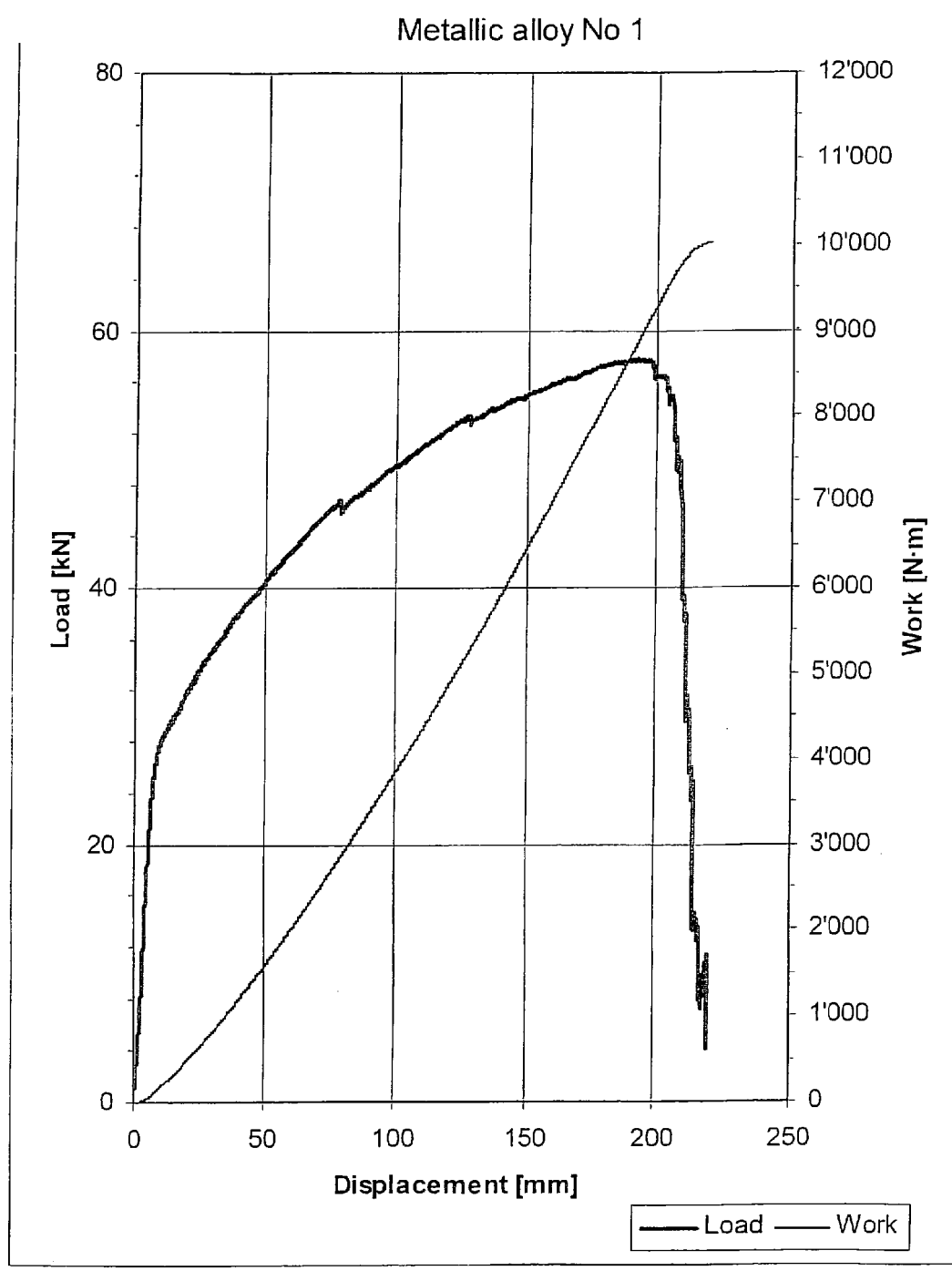
FIG. 4-6 show three extension-load diagrams.
Figure 5:
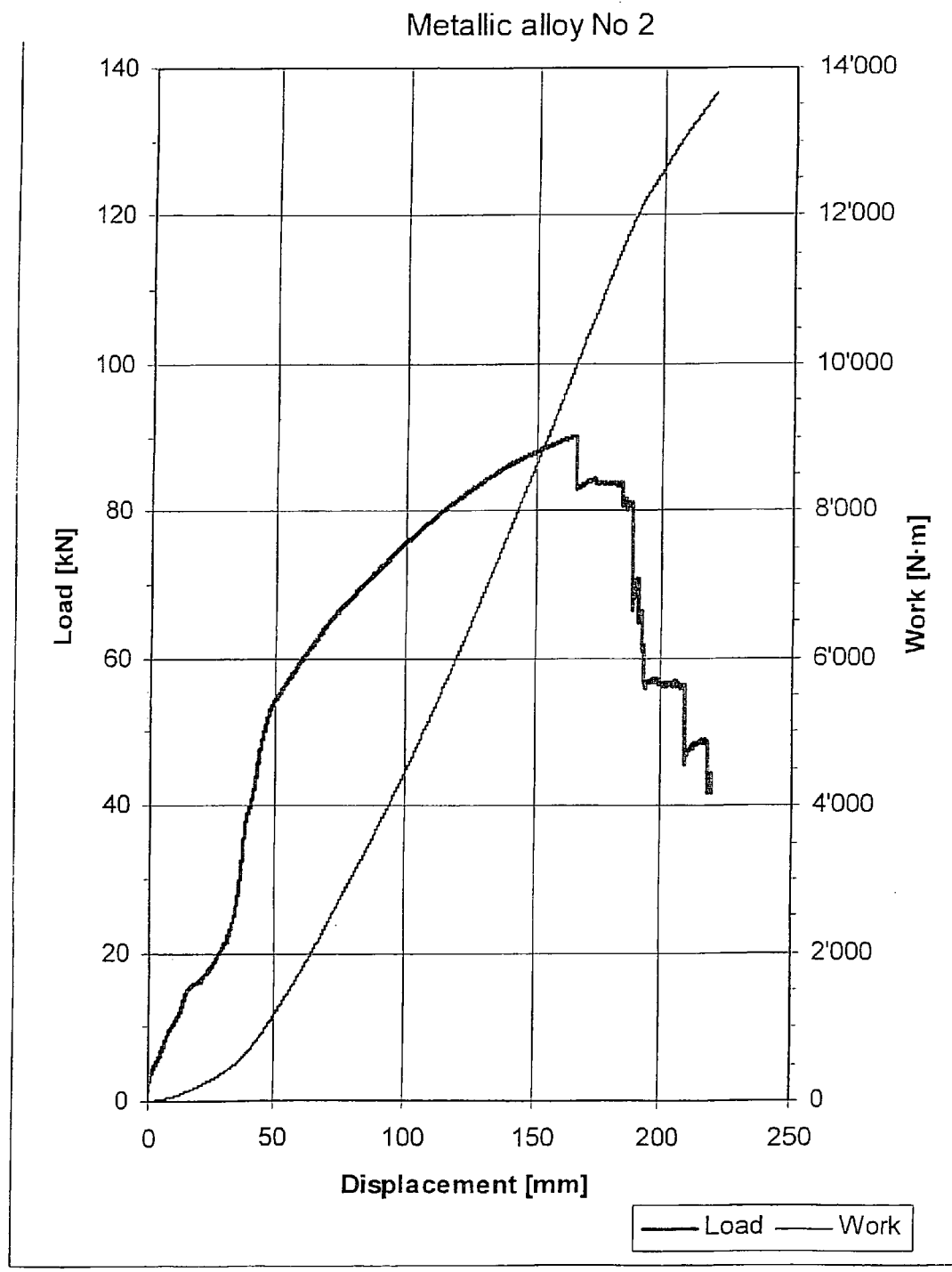
Figure 6:
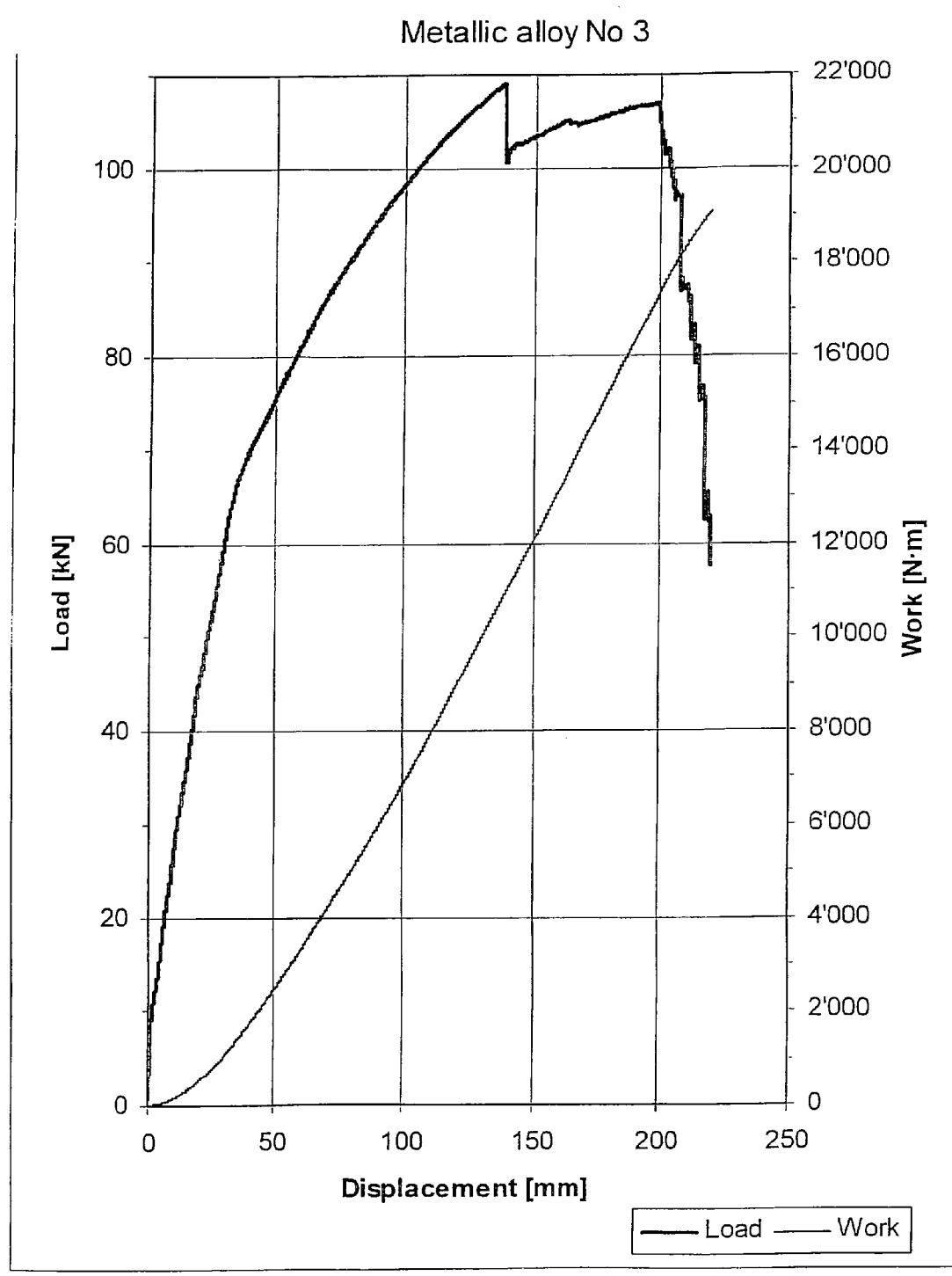

Purely by way of example, the force-extension diagrams of three cables with different diameters and of wire of different alloys are shown in the FIGS. 4-6. The trials have been carried out with cables with the following characteristics:

| Item | Mass [kg] | Diameter [mm] | Length [mm] | Fmax [kN] | Work to Fmax [N · m] | Work to end of test [N · m] |
|---|---|---|---|---|---|---|
| No. 1 | 0.5 | 12-13 | 660 | 57.8 | 8,900 | 10,000 |
| No. 2 | 0.8 | 14-15 | 575 | 90.3 | 10,000 | 13,700 |
| No. 3 | 1.0 | 16-17 | 595 | 109.2 | 10,900 | 19,100 |

From the diagrams it is evident that with a cable length of about 600 mm the maximal extension up to reaching the maximal tensile force is about 200 mm. From this, as is evident from the subsequent table, there results an extremely high working load up to achieving the maximal tear force (work to Fmax), specifically depending on the embodiment example, 8,900 N.m or in the third example 10,900 N.m. A comparable test with a steel cable of highly elastic steel with a cable diameter of 15 mm, which consequently corresponds to the embodiment example according to No. 2 only has a work of 2,750 N.m up to reaching the maximal tear force. The work absorption of 5,000 N.m prescribed today for an approved arrester cable may therefore be achieved with the solution according to the invention without any problem. Trials have been made with wires which are known on the market under the following descriptions, specifically Inconel® 600, Inconel® 601, Inconel® 617, Inconel® 625 and Inconel® 686. With the description Inconel® it is the case of a registered trademark of the company Huntington Alloys Canada Ltd.

For the purpose which is of interest here, practically all Ni—Cr alloys with a Ni-component of 50-80% by weight have been shown to be usable, wherein preferably however the Ni-content lies between 60 and 75 percentage by weight. Known Inconel® 600 contains for example 60% Ni, 22% Cr and 18% Fe. With known alloys, generally the weight components of the individual components lie in the following regions:

| | |
|---|---|
| Ni | 50-80% |
| Cr | 15-25% |
| Fe | 5-25% |
| Mo | 0-10% |

In particular Inconel® alloys are known which for achieving weldability or for the reduction of the corrosion or of the crevice corrosion, are provided with lesser shares of further metals such as for example wolfram, niobium, tungsten or cobalt. These additions are however not of any relevance for the purpose which is interest here. The quantities required for these applications are so small that an alloy which is manufactured specifically for this or an exactly selected alloy is not required. Practically all Ni—Cr alloys which have been tested have the required properties. Only alloys with a certain component of molybdenum and niobium have displayed a greater extension. Inasmuch as this is concerned such alloys are to be somewhat preferred. However this is not absolutely necessary since in any case despite the extreme demands, with the safety arrester cable according to the invention, an approximately doubled safety is achieved with respect to the maximally required properties.

As may be recognized from the diagrams, the work forms the area below the force extension diagram curve. If this work is to be additionally increased, then this may be achieved by the addition of a number of loops of yarn or relatively rigid plastic filaments. With this, in particular plastic filaments from the selection of PBO (poly-p-phenylene-2,6-benzo-bisoxazole) or carbon fibers or also P-aramides are considered.

With the manufacture of cables of metal or plastic it has been known until this date that by way of twisting and rotating the individual strands, the total strength of a cable, in particular of a textile or steel cable may be increased. Corresponding trials have been carried out for this. The amazing result is the fact that a twisting or rotation of the cable reduces the work to be absorbed until reaching the maximum tear force. The maximum tear force is also reduced by way of this. Whilst the maximal tear force however is only slightly reduced, the work to be absorbed however considerably reduces until reaching the maximum tear force. Thus for example a cable with 117 windings of a wire with 0.5 mm diameter was tested. The cable had a length of 610 mm. The maximal tear force Fmax was achieved at 33 kN. The maximum extension was 160 mm.

An identically manufactured cable was subsequently rotated (twisted) by three revolutions. The cable twisted in this manner still had a length of 605 mm. The maximal tear force in this case was only 30 kN, i.e. the maximal tear force was almost 10% lower. Whereas with the work until reaching the maximal tear force was 4,300 N.m with an untwisted cable, this work was only 3,435 N.m with the twisted cable, whilst the maximum extension value reduced to 146 mm. All these details are completely contrary to the values which are ascertained with the plastic cables. The result according to the invention is therefore completely surprising for the man skilled in the art. It however leads to a very interesting possibility in that a cable which is designed too strong may be changed in a very simple manner with respect to its physical properties. As is known, formula 1 racing cars are designed such that the actual cockpit forms a high-safety cell. The chassis engages on this. If energies which are too high are capable of being transmitted via the safety arrester cable, then this may lead to the fact that the safety arrester cable practically never tears, and as a result and under certain conditions such high energies may be transmitted to the safety cell that this may be damaged. This in principle may be corrected thus by way of suitably twisting the safety arrester cable according to the invention.

The use of Ni—Cr alloys for manufacturing cables is not known on our part. With the use of cables having a high ultimate load, the extension occurring here is rather undesirable. The use of Ni—Cr alloys has previously been limited to applications with which the material is subjected to high chemical loading. Ni—Cr alloys are known for their excellent resistance to oxidation and high temperature corrosion. Accordingly these alloys are above all applied in petrochemistry, in the field of gas turbine construction, in chemical processing technology, in space travel, in environmental protection installations and atomic reactors

| LIST OF REFERENCE NUMERALS |
| --- |
| 1 safety arrester cable |
| 2 windings |
| 3 tabs |
| 4 covering |
| 5 part tabs |

The invention claimed is:

1. A safety arrester cable for connecting a wheel of a racing car to its chassis, wherein the safety arrester cable is formed of a multitude of untwisted windings that form closed loops, wherein in each case an open tab is formed at both ends of the safety arrester cable, and wherein the windings contain more than 70% by weight nickel or austenitic Ni—Cr alloy.

2. A safety arrester cable according to claim 1, wherein the Ni—Cr alloy contains a nickel share of 50-80% by weight.

3. A safety arrester cable according to claim 2, wherein said windings consist of wire of a Ni—Cr alloy containing molybdenum and niobium.

4. A safety arrester cable according to claim 1, wherein the windings each have a thickness between 0.3 and 1.4 mm.

5. A safety arrester cable according to claim 1, wherein said windings additionally contain a number of loops of yarn of semi-rigid filaments formed from the selection of PBO (poly-p-phenylene-2,6-benzo-bisoxazole), carbon fibers and P-aramides.

6. A safety arrester cable according to claim 5, wherein the number of loops of yarn is less than 50% of the number of loops of metal.

7. A safety arrester cable according to claim 1, wherein the cable as a whole is twisted.

8. A safety arrester cable according to claim 1, wherein the open tabs at the two cable ends are divided into two part tabs.

9. A safety arrester cable according to claim 1, wherein a shrinkage sleeve is pulled over the cable, which secures the relative position of the windings and leaves the tabs free at the cable ends.

10. A safety arrester cable according to claim 2, wherein a shrinkage sleeve is pulled over the cable, which secures the relative position of the windings and leaves the tabs free at the cable ends.

* * * * *

UNITED STATES PATENT AND TRADEMARK OFFICE
CERTIFICATE OF CORRECTION

PATENT NO. : 7,305,814 B2  Page 1 of 1
APPLICATION NO. : 11/110142
DATED : December 11, 2007
INVENTOR(S) : Walter Nuesch It is certified that error appears in the above-identified patent and that said Letters Patent is hereby corrected as shown below:

Col. 1, line 31, delete "yams" and substitute therefore -- yarns --;

Col. 1, line 46, delete "yams" and substitute therefore -- yarns --;

Col. 4, line 32, delete "yam" and substitute therefore -- yarn --.

Signed and Sealed this

Sixth Day of May, 2008

JON W. DUDAS
*Director of the United States Patent and Trademark Office*